United States Patent [19]

Kaneda et al.

[11] Patent Number: 4,616,353
[45] Date of Patent: Oct. 7, 1986

[54] TRACKING SERVO WITH CLOSED LOOP GAIN CORRECTION

[75] Inventors: Isami Kaneda, Yokohama; Yasushi Sano, Yamato, both of Japan

[73] Assignee: Victor Company of Japan Ltd., Yokohama, Japan

[21] Appl. No.: 599,941

[22] Filed: Apr. 13, 1984

[30] Foreign Application Priority Data

Apr. 14, 1983 [JP] Japan .............................. 58-56043[U]

[51] Int. Cl.$^4$ ...................... G11B 21/10; H04N 5/903
[52] U.S. Cl. ...................................... 369/43; 358/342; 358/907
[58] Field of Search .................... 369/43–46; 360/77–78; 358/342, 907

[56] References Cited

U.S. PATENT DOCUMENTS

| Re. 31,160 | 2/1983 | Kinjo | 369/43 |
| 4,148,083 | 4/1979 | Watanabe | 360/77 |
| 4,331,976 | 5/1982 | Kinjo et al. | 369/43 |
| 4,397,010 | 8/1983 | Nabeshima | 360/77 |
| 4,420,827 | 12/1983 | Wada et al. | 360/77 |
| 4,499,505 | 2/1985 | Sugiyama et al. | 358/907 |
| 4,510,531 | 4/1985 | Sugiyama | 358/342 |
| 4,530,013 | 7/1985 | Sugiyama et al. | 358/907 |

FOREIGN PATENT DOCUMENTS

| 56-58140 | 5/1981 | Japan | 369/43 |
| 56-20528 | 8/1982 | Japan | 369/43 |
| 2088594 | 6/1982 | United Kingdom | 369/43 |

OTHER PUBLICATIONS

DiStefano, III et al., Schaum's Outline of Theory and Problems of Feedback and Control Systems, ©1967, pp. 116–117, Example 7.8.

Primary Examiner—Raymond F. Cardillo
Assistant Examiner—James E. Tomassini
Attorney, Agent, or Firm—Roberts, Spiecens & Cohen

[57] ABSTRACT

A tracking servo circuit corrects for closed loop gain variations due to wear of the disc, the width of the electrode of the reproducing stylus, etc. The disc contains an information track bounded by servo tracks used to derive a tracking error signal. This tracking error signal is supplied to an AGC circuit after being filtered and detected. The gain of the AGC circuit decreases as the voltage level of the tracking error signal increases. The tracking error is also supplied to an electric-mechanical conversion system after an oscillatory signal of constant frequency and amplitude is added to it. The oscillator signal is used to stabilize the gain of the servo loop. The electric-mechanical conversion system corrects the position of the stylus in response to these signals.

5 Claims, 14 Drawing Figures

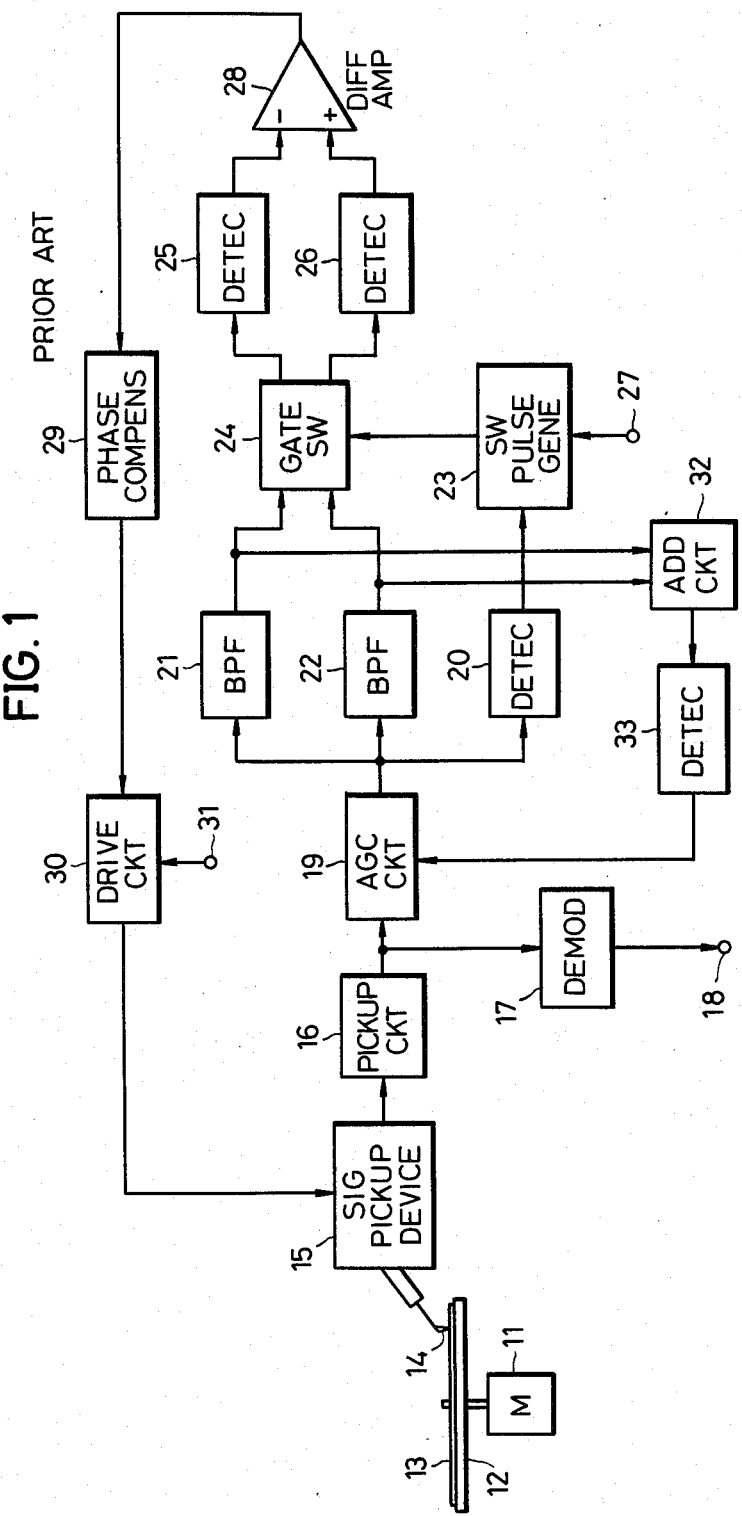

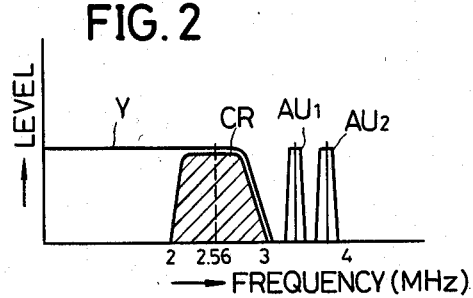
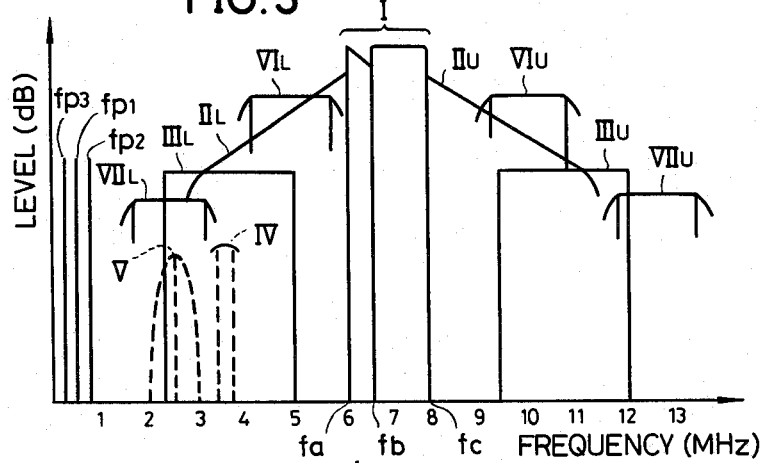
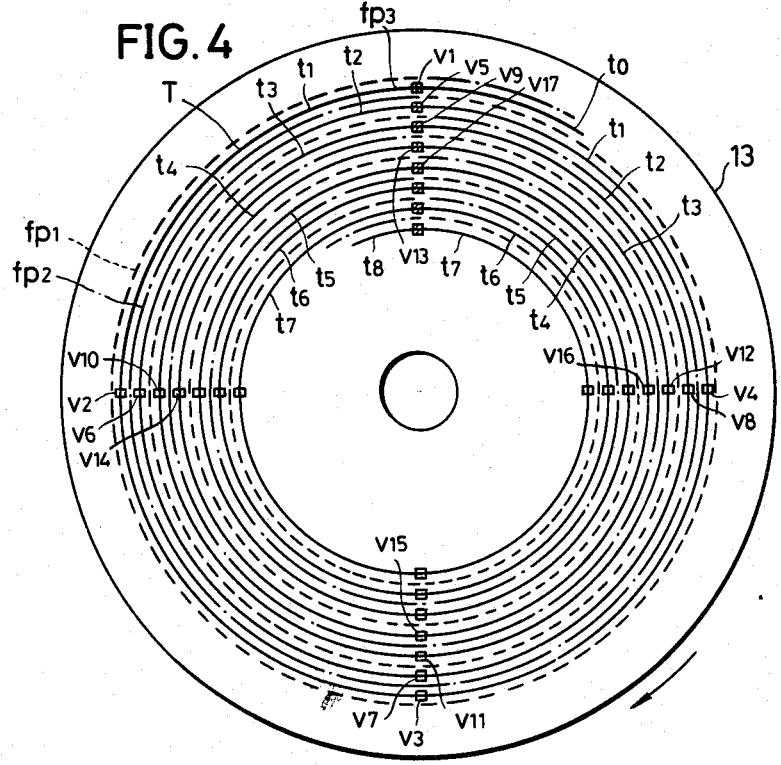

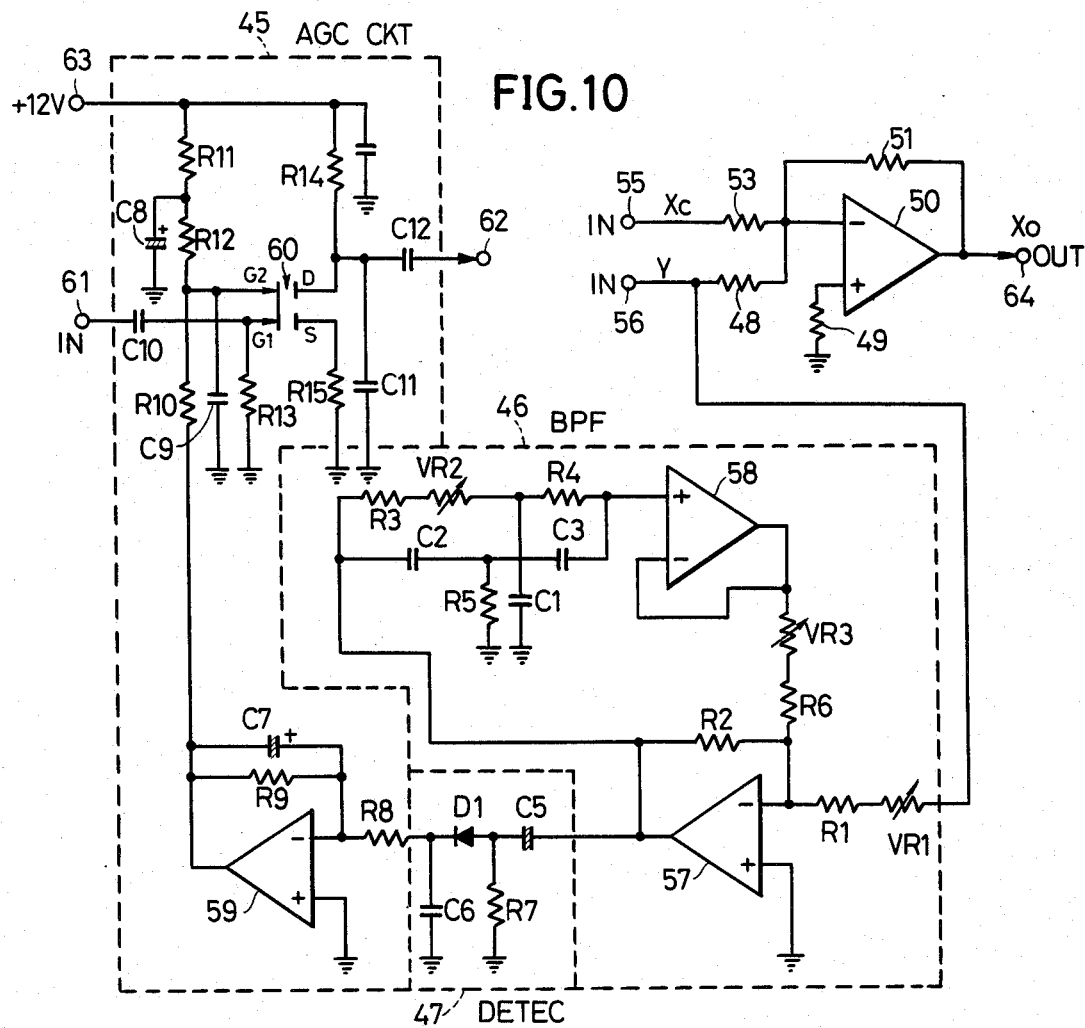
FIG.10
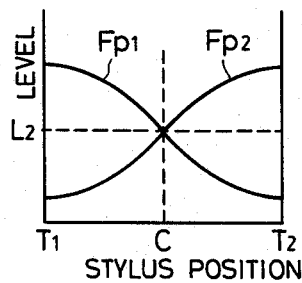
FIG.11A
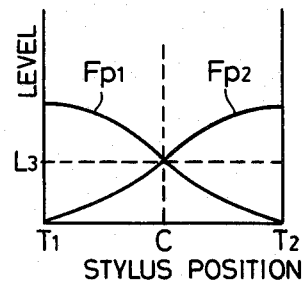
FIG.11B

TRACKING SERVO WITH CLOSED LOOP GAIN CORRECTION

BACKGROUND OF THE INVENTION

The present invention generally relates to tracking servo circuits for rotary recording medium reproducing apparatuses, and more particularly to a tracking servo circuit for a rotary recording medium reproducing apparatus which obtains a reproduced information signal by reading and reproducing a recorded signal by a pickup reproducing element which scans over a recorded track on a rotary recording medium. The tracking servo circuit according to the present invention causes the pickup reproducing element to accurately follow and scan over an information signal recorded track so as to obtain a reproduced information signal of a satisfactory signal-to-noise (S/N) ratio, based on a relative level difference and a polarity of the relative level difference between first and second reference signals which are reproduced from both sides of the information signal recorded track.

Conventionally, a rotary recording medium (hereinafter simply referred to as a disc) is known on which an information signal is recorded on a spiral track or concentric tracks as variations in geometrical configuration. In such a disc, reference signals for tracking control are recorded on both sides of the information signal recorded track, with a predetermined period. The recorded surface of the disc is flat, and the disc has an electrode function. A tracking servo circuit is provided in a reproducing apparatus which reproduces the recorded information signal from the disc by use of a pickup reproducing element. The tracking servo circuit forms a tracking error signal by differentially amplifying detected levels of envelopes of the first and second reference signals which are discriminated and separated from the reproduced signal. The pickup reproducing element is displaced by a minute distance so as to minimize the tracking error with respect to the information signal recorded track, responsive to the tracking error signal. In other words, by noting that a relative level difference between detected levels of envelopes of the first and second reference signals represents the tracking error quantity and that a polarity of the relative level difference represents the direction of the tracking error, the tracking servo circuit is designed as a closed loop which controls the displacement of the pickup reproducing element so as to make the relative level difference become equal to zero.

The level of a reproduced RF signal which is obtained from the pickup reproducing element and is applied to the tracking servo circuit, varies due to the recorded wavelengths of the first and second reference signals, differing according to the radial position on the disc, the width, depth, and shape of the recorded pits on the disc which vary, and the like. Further, in a case where the pickup reproducing element is a reproducing stylus of the type which detects the variations in the electrostatic capacitance and comprises an electrode, the level of the reproduced RF signal greatly varies (by ±5 dB, for example) due to a change in the state in which the reproducing stylus makes sliding contact with the disc, the wear of the disc, the width of the electrode of the stylus, and the like. Accordingly, the levels of the first and second reference signals which are discriminated and separated from the reproduced RF signal, constantly fluctuate due to the level variations in the reproduced RF signal. For this reason, the detected levels of the envelopes of the first and second reference signals do not accurately represent the tracking error quantity. Thus, when these detected levels of the envelopes of the first and second reference signals are used as they are to form the tracking error signal which is applied to a mechanism which displaces the pickup reproducing element, it is impossible to carry out a stable tracking control, and a mistracking inevitably occurs.

Accordingly, a tracking control apparatus was proposed in a U.S. Pat. No. Re 31160 in which the assignee is the same as the assignee of the present application. According to this proposed tracking control apparatus, an automatic gain control (AGC) circuit is provided in a signal transmission path before a stage where the reproduced RF signal is applied to a differential amplifier within the tracking servo circuit, so as to compensate for the level fluctuations in the two kinds of reference signals. The levels with which the two kinds of reference signals are reproduced fluctuate according to the tracking error quantity of the reproducing element with respect to the information signal recorded track, and hence, the tracking servo cannot be carried out in a normal manner when an automatic gain control is performed to independently and constantly control the levels of the two kinds of reproduced reference signals to a constant level. Therefore, the proposed tracking control apparatus is designed to control a sum of the levels of the reproduced first and second reference signals, to a predetermined constant level.

The loop gain of the tracking servo circuit is set to a high value near a limit of the system, because the response of the pickup reproducing element becomes slower as the loop gain becomes smaller. Hence, an inconsistency in the loop gain introduces serious problems. In a characteristic curve which takes the level variations of the first and second reference signals within the reproduced RF signal versus the tracking error of the pickup reproducing element, it is known that the loop gain described above can be represented by the slope of the characteristic curve where there is no tracking error. The levels of the reproduced reference signals greatly fluctuate according to the wear of the disc, the width of the electrode of the reproducing stylus, and the like, and varies non-linearly in response to the tracking error quantity.

However, the proposed tracking control apparatus described before simply performs an automatic gain control so that the sum of the levels of the reproduced first and second reference signals constantly assumes a constant level. Thus, the loop gain varied according to the wear of the disc, the width of the electrode of the reproducing stylus, and the like. Moreover, due to the variation of the loop gain, the operation to compensate for the tracking error greatly varied. As a result, the loop gain had to be set to a value which was considerably low compared to an allowable upper limit value, by taking into account the variation in the loop gain. In addition, when the loop gain was set to a value in the vicinity of the allowable upper limit value, the tracking servo operation became unstable due to the variation in the loop gain.

SUMMARY OF THE INVENTION

Accordingly, it is a general object of the present invention to provide a novel and useful tracking servo circuit for a rotary recording medium reproducing apparatus, in which the problems described heretofore have been eliminated.

Another and more specific object of the present invention is to provide a tracking servo circuit for a rotary recording medium reproducing apparatus, which comprises a signal superimposing circuit for superimposing on a first tracking error signal a signal having a constant amplitude and a constant frequency within a frequency band which is lower than a frequency band in which an information signal was recorded on an information signal recorded track, so as to obtain a second tracking error signal, a filter circuit for separating and filtering the signal having the constant frequency from within the first or second tracking error signal supplied thereto, and an automatic gain control circuit means for controlling the level of a reproduced signal which is obtained from a pickup reproducing element based on a detected level of an envelope of an output signal of the filter circuit, so that the level of the signal which is within the input signal of the filter circuit and has the constant frequency becomes approximately constant.

According to the tracking servo circuit of the present invention, it is possible to constantly maintain the loop gain approximately constant, even when various conditions like the pickup reproducing element such as a reproducing stylus and the disc are inconsistent. Thus, it is possible to set the loop gain to an optimum value which is near the limit of the system. As a result, it is possible to carry out a stable and accurate tracking servo operation which quickly responds to the tracking error and causes the pickup reproducing element to follow and scan over the recorded track.

Still another object of the present invention is to provide a tracking servo circuit in which a signal having a constant frequency which is selected to a frequency in a vicinity of a point where the loop gain of the tracking servo circuit becomes 0 dB, is superimposed on the tracking error signal. According to the tracking servo circuit of the present invention, it is possible to obtain the superimposed signal with a satisfactory signal-to-noise (S/N) ratio, and for this reason, it is possible to more stably control the loop gain to a constant value.

Other objects and further features of the present invention will be apparent from the following detailed description when read in conjunction with the accompanying drawings.

BRIEF DESCRIPTION OF THE DRAWINGS

FIG. 1 is a systematic block diagram showing an example of a tracking servo circuit in a conventional rotary recording medium reproducing apparatus;

FIG. 2 shows an example of a frequency spectrum of an information signal which is recorded on a rotary recording medium which is to be played in the reproducing apparatus;

FIG. 3 shows an example of a frequency spectrum of a frequency modulated signal which is obtained by frequency-modulating a carrier by the information signal shown in FIG. 2 and is actually recorded on the rotary recording medium;

FIG. 4 shows an example of a track pattern on the rotary recording medium;

FIG. 10 is a concrete circuit diagram showing an embodiment of an essential part of the circuit system show in FIG. 9; and FIGS. 11A and 11B show examples of a relationship between a track scanning position of the reproducing stylus in the tracking servo circuit according to the present invention and the levels of envelopes of reference signals which are reproduced at the track scanning position.

DETAILED DESCRIPTION

Figure 5A:
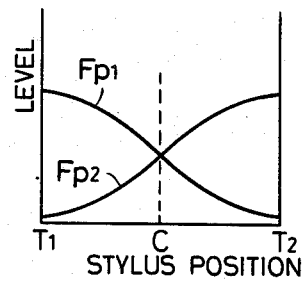
FIGS. 5A and 5B show examples of a relationship between a track scanning position of a reproducing element in a reproducing apparatus having no automatic gain control circuit and the levels of envelopes of reference signals which are reproduced at the track scanning position.

First, description will be given with respect to the construction and operation of a conventional tracking servo circuit. FIG. 1 is a systematic block diagram showing an example of a conventional tracking servo circuit. The tracking servo circuit shown in FIG. 1 comprises an automatic gain control (AGC) circuit which corresponds to (and is not identical to) FIG. 9 of a U.S. Pat. No. Re 31160 in which the assignee is the same as the assignee of the present application. In FIG. 1, a disc 13 is placed on a turntable 12 which is rotated at a rotational speed of approximately 900 rpm, for example, by a motor 11. A recorded signal on the disc 13, is picked up and reproduced by detecting the variation in electrostatic capacitance between an electrode of a reproducing stylus 14 and the disc 13. For example, the recorded signal comprises a frequency modulated (FM) signal having a frequency spectrum shown in FIG. 3, first and second reference signals fp1 and fp2 for tracking control, and a third reference signal fp3 is used as an index signal. The FM signal is obtained by frequency-modulating a carrier by a video signal and an audio signal having frequency spectrums shown in FIG. 2, for example.

In FIG. 2, a band-limited luminance signal is represented by Y, a carrier chrominance signal which is frequency-converted into a low frequency band (low-band-converted carrier chrominance signal) by CR, and first-channel and secondchannel FM audio signals $f_{A1}$ and $f_{A2}$ by $AU_1$ and $AU_2$, respectively. The frequency-division-multiplexed signal having the frequency spectrum shown in FIG. 2 is supplied to a frequency modulator, and is formed into an FM signal having a frequency spectrum shown in FIG. 3. In FIG. 3, a carrier frequency deviation band of 2.3 MHz of the frequency-modulated luminance signal is represented by I, a frequency of 6.1 MHz corresponding to a tip of a synchronizing signal by fa, a frequency of 6.6 MHz corresponding to a pedestal level by fb, and a frequency of 7.9 Hz corresponding to a white peak by fc. In addition, the lower and upper sidebands of the frequency-modulated luminance signal are represented by $II_L$ and $II_U$, and the lower and upper sidebands of a signal which is obtained by further frequency-modulating the FM audio signals $f_{A1}$ and $f_{A2}$ indicated by $AU_1$ and $AU_2$ in FIG. 2 by $III_L$ and $III_U$. The carriers of the 2-channel FM audio signals $f_{A1}$ and $f_{A2}$ having the frequencies of 3.43 MHz and 3.73 MHz, respectively, are indicated by IV.

Further, in FIG. 3, a frequency band of the low-band-converted carrier chrominance signal is represented by V, which is the same as the frequency band indicated by CR in FIG. 2. In addition, first sidebands obtained when the low-band-converted carrier chrominance signal is frequency-modulated are represented by $VI_L$ and $VI_U$, and second sidebands obtained when the low-band-converted carrier chrominance signal is frequency-modulated by $VII_L$ and $VII_U$.

The FM audio signal having the frequency spectrum described heretofore, is recorded as a main information signal.

For example, the main information signal is recorded onto a disc according to a method described in detail in a U.S. Pat. No. 4,331,976 in which the assignee is the same as the assignee of the present application. That is, for example, the main information signal is applied to a light modulator (not shown) wherein a laser light is modulated and converted into a modulated light beam. The modulated light beam is condensed on a original disc which is coated with a photosensitive agent and undergoing synchronous rotation. A main track constituted by rows of intermittent pits are formed according to a repetition frequency of the main information signal, by a known developing process. Accordingly, the video signal and the 2-channel audio signals are simultaneously recorded on the same main track. Reference signals fp1 and fp2 for tracking control are applied to an independent light modulator (not shown) wherein a laser light is similarly modulated. The modulated light beam from this independent light modulator is used to form subtracks constituted by rows of intermittent pits, simultaneously with the forming of the main track. A disc is duplicated from such an original disc, by a known disc pressing process.

A disc which is recorded and formed in this manner, has a track pattern shown in FIG. 4. The video and audio signals are recorded on a spiral track T of the disc 13, so that two frames, that is, four fields of the video signal are recorded for one track turn. In FIG. 4, a track for the reference signal fp1 is indicated by a broken line, and a track of the reference signal fp2 is indicated by a one-dot chain line. Positions where a vertical synchronizing signal is recorded in each of the fields, are indicated by V1, V2, V3, . . . . In addition, track parts of the spiral track T which correspond to one revolution of the disc, are indicated by tracks t1, t2, t3, . . . . A third reference signal fp3 is recorded at starting end positions of each of the tracks t1, t2, t3, . . . , that is, at positions V1, V5, V9, . . . where the sides on which the reference signals fp1 and fp2 are recorded with respect to the tracks t1, t2, t3, . . . change over. Four fields of the video signal are recorded on the track t1.

Pits having different lengths according to the wavelengths of the main information signal, are formed intermittently along the spiral track T, and no guide groove is formed for guiding the reproducing stylus. The disc 13 has an electrode function, so that variations in the electrostatic capacitance between an electrode of the reproducing stylus which will be described hereinafter and the disc can be detected. Further, an address signal which is used when carrying out a random access, is multiplexed with the video signal in a specific duration within the vertical blanking period.

Returning now to the description of FIG. 1, a signal pickup device 15 comprises tracking coils for moving the reproducing stylus 14 in the radial direction of the disc 13 and displacing the reproducing stylus 14 by a small quantity in the track width direction of the disc 13, jitter compensating coils for displacing the reproducing stylus 14 in a direction tangential to the track, and the like. The electrostatic capacitance which is formed between the electrode of the reproducing stylus 14 and the disc 13, passes through the signal pickup device 15, and is supplied to a resonant circuit within a pickup circuit 16 so as to vary the resonance frequency of the resonant circuit. In addition to this resonant circuit, the pickup circuit 16 comprises a high frequency oscillator for applying an external signal having a constant frequency of approximately 1 GHz, for example, to the resonant circuit, an amplitude detecting circuit, and a preamplifying circuit. Because the amplitude of the signal having the constant frequency which is obtained from the resonant circuit varies according to the variation in the electrostatic capacitance, that is, according to the variation in the resonance frequency of the resonant circuit, the amplitude detecting circuit is provided to detect this variation in the amplitude. The preamplifying circuit amplifies the amplitude-detected high-frequency signal (reproduced RF signal) from the amplitude detecting circuit.

The reproduced RF signal obtained from the pickup circuit 16, is supplied to a demodulating circuit 17 wherein the reproduced RF signal is frequency-demodulated, and the main information signal (the video signal and the FM audio signals in this case) is produced through an output terminal 18. On the other hand, the reproduced RF signal from the pickup circuit 16 is also supplied to a detector 20, and bandpass filters 21 and 22, through an automatic gain control (AGC) circuit 19.

The detector 20 frequency-selects the reference signal fp3 within the reproduced signal, and applies an fp3 detection signal which is in phase with the reference signal fp3 to a switching pulse generator 23. The bandpass filter 21 frequency-selects the first reference signal fp1 within the reproduced signal, and applies the reference signal fp1 to one input terminal of a gate switching circuit 24. On the other hand, the bandpass filter 22 frequency-selects the second reference signal fp2 within the reproduced signal, and applies the reference signal fp2 to the other input terminal of the gate switching circuit 24. The gate switching circuit 24 is switched responsive to a switching pulse from the switching pulse generator 22. For example, outputs of the bandpass filters 21 and 22 are independently connected to inputs of detectors 25 and 26 during a high-level duration of the switching pulse, and the outputs of the bandpass filters 21 and 22 are independently connected to the inputs of the detectors 25 and 26 during a low-level duration of the switching pulse.

The polarity and period of the switching pulse which is generated from the switching pulse generator 23, are varied in response to a reproducing mode signal which is supplied to the switching pulse generator 23 through an input terminal 27. The polarity of the switching pulse is varied when the detection signal is generated by the detector 20 or when a kick pulse (excluding a kick pulse generated while the reference signal fp3 is being reproduced) is supplied to a driving circuit 30 which will be described hereinafter through an input terminal 31. Thus, an envelope of the reference signal fp1 or fp2 which is reproduced from a subtrack on the outer peripheral side of the disc with respect to the main track which is to be reproduced, is detected by the detector 25. On the other hand, an envelope of the reference signal fp2 or fp1 which is reproduced from a subtrack on the inner peripheral side of the disc with respect to the main track which is to be reproduced, is detected by the detector 26. Envelope detection signals produced from these detectors 25 and 26, are supplied to a differential amplifier 28 provided in a subsequent stage. The differential amplifier 28 produces a tracking error signal having a polarity which is in accordance with the direction of the tracking error, and having a level which is in accordance with the tracking error quantity. This tracking error signal is converted into a predetermined driving voltage in a phase compensating circuit 29 and the driving circuit 30, and is then applied to the tracking coils within the signal pickup device 15. As a result, the stylus tip of the reproducing stylus 14 is displaced by a small quantity in the radial direction of the disc 13 so as to minimize the tracking error.

The reproduced reference signal fp1 from the bandpass filter 21 and the reproduced reference signal fp2 from the bandpass filter 22 are respectively supplied to an adding circuit 32 wherein the reproduced reference signals fp1 and fp2 are added. An added signal from the adding circuit 32 is supplied to a detecting circuit 33 wherein an envelope of the output signal of the adding circuit 32 is detected. A detected D.C. voltage which is produced from the detecting circuit 33, is applied to the AGC circuit 19 so as to variably control the gain thereof. Accordingly, the reproduced RF signal is obtained from the AGC circuit 19 so that the added signal of the reproduced reference signals fp1 and fp2 constantly assumes a constant level. Thus, regardless of whether the disc 13 and the reproducing stylus 14 are brand-new or have been used for a long period of time, the reproduced RF signal obtained at the output of the AGC circuit 19 constantly assumes a predetermined constant level, and the instantaneous level fluctuation is also compensated to the predetermined constant level. However, the loop gain varies as a result.

Figure 5B:
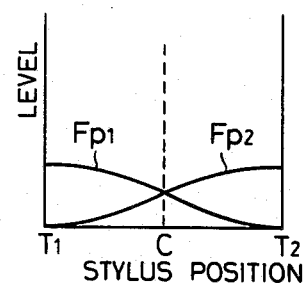

It will now be assumed that when a disc is played in a reproducing apparatus which does not have the AGC circuit 19, the detected levels of envelopes of the reproduced reference signals fp1 and fp2 with respect to the reproducing position of the reproducing stylus 14 can be described by the characteristic curves shown in FIG. 5A for a first disc, and that the same can be described by the characteristic curves shown in FIG. 5B for a second disc In FIGS. 5A, 5B, 6A, 6B, 11A, and 11B, the horizontal axis represents the reproducing position of the reproducing stylus 14. The center position (the position where the tracking error is zero) of the information signal recorded track (main track) is indicated by C, a subtrack position (the position where the tracking error is ½ the track width) adjacent to the main track and is recorded with the reference signal fp1 is indicated by T1, and a subtrack position (the position where the tracking error is ½ the track width) adjacent to the main track and is recorded with the reference signal fp2 is indicated by T2. In addition, the vertical axis represents the levels of the envelopes of the reproduced reference signals fp1 and fp2. A variation curve of the detected level of the envelope of the reproduced reference signal fp1 with respect to the track position, is indicated by Fp1. On the other hand, a variation curve of the detected level of the envelope of the reproduced reference signal fp2 with respect to the track position, is indicated by Fp2. The curves Fp1 and Fp2 vary depending on the shape of pits, depth of pits, the electrode width of the reproducing stylus 14, and the like of the reference signals fp1 and fp2.

Figure 6A:
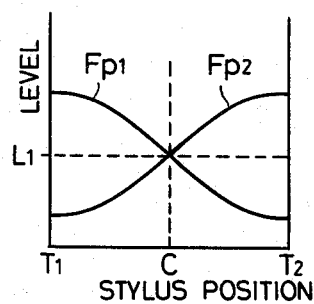
FIGS. 6A and 6B show examples of a relationship between a track scanning position of a reproducing stylus in the circuit shown in FIG. 1 and the levels of envelopes of reference signals which are reproduced at the track scanning position.
Figure 6B:
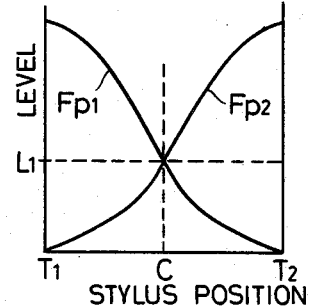

When the tracking is carried out with respect to the first disc having the characteristic shown in FIG. 5A by the conventional tracking servo circuit shown in FIG. 1, the reference signals fp1 and fp2 are reproduced so that the sum of the levels of the reproduced reference signals fp1 and fp2 at the output of the AGC circuit 19 becomes constant, in order to reproduce the reference signals fp1 and fp2 with a predetermined constant level L1 when the reproducing stylus 14 is positioned at the center position C of the main track as shown in FIG. 6A. On the other hand, when the tracking is carried out with respect to the second disc having the characteristic shown in FIG. 5B by the conventional tracking servo circuit shown in FIG. 1, the reference signals fp1 and fp2 are reproduced so that the sum of the levels of the reproduced reference signals fp1 and fp2 at the output of the AGC circuit 19 become constant, in order to reproduce the reference signals fp1 and fp2 with the same predetermined constant level L1 when the reproducing stylus 14 is positioned at the center position C of the main track as shown in FIG. 6B.

However, the variation curves Fp1 and Fp2 differ between the first and second discs as shown in FIGS. 5A and 5B. Thus, the slopes of the variation curves Fp1 and Fp2 when the reproducing stylus 14 is positioned at the center position C, that is, the loop gains of the tracking servo circuit for the two cases, differ. As a result, the problems described before are introduced.

Figure 7:
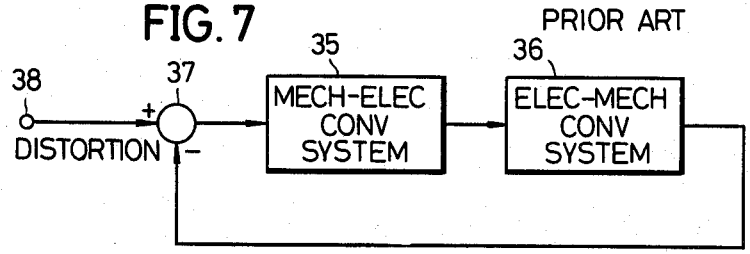
FIG. 7 is a systematic block diagram showing a general construction of the circuit shown in FIG. 1.

Accordingly, the present invention controls the level of the reproduced RF signal so that the loop gain constantly assumes a predetermined constant value, based on the principle described heretofore. The tracking servo circuit shown in FIG. 1 can be described by a systematic block diagram shown in FIG. 7. In FIG. 7, a mechanical-electrical converting system 35 is supplied with a following error quantity (dimension in distance) with respect to the main track which is on the disc 13 and is to be reproduced, of the reproducing stylus 14 which is under the tracking control. The converting system 35 converts the following error quantity to an electrical signal, that is, a tracking error signal (voltage). The converting system 35 is made up of a circuit part between the pickup circuit 16 and the differential amplifier 28, excluding the AGC circuit 19. The tracking error signal from the converting system 35 is supplied to an electrical-mechanical converting system 36 which is made up of the phase compensating circuit 29, the driving circuit 30, the reproducing stylus 14, and the signal pickup device 15. The converting system 36 controls and displaces the stylus tip of the reproducing stylus 14 by a quantity which is in accordance with the level of the tracking error signal, in a direction which is in accordance with the polarity of the tracking error signal. The displacing quantity, that is, the response quantity (dimension in distance) of the stylus tip, is supplied to an adding point 37 and is added with a distortion (dimension in distance) from a terminal 38. The following error which is obtained by the addition at the adding point 37, is supplied to the mechanical-electrical converting system 35. The distortion represents the eccentricity of the recorded tracks on the disc 13 and the like.

Figure 8:
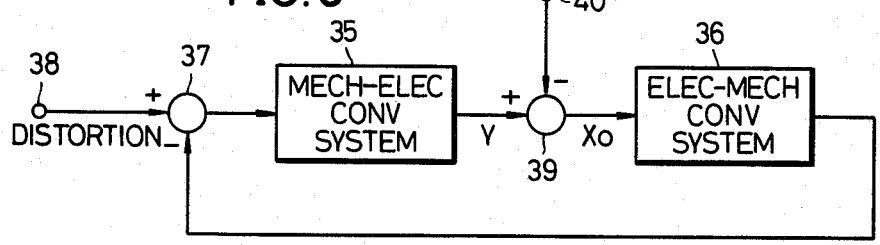
FIG. 8 is a systematic block diagram for explaining the operating principle of a tracking servo circuit for a rotary recording medium reproducing apparatus according to the present invention.

According to the present invention, the loop gain of the tracking servo circuit is designed as shown in FIG. 8. In FIG. 8, those parts which are the same as those corresponding parts in FIG. 7 are designated by the same reference numerals. In FIG. 8, an adding point 39 is located in a transmission path between the output of the mechanical-electrical converting system 35 having a transfer function G1 and the input of the electricalmechanical converting system 36 having a transfer function G2. An external disturbance Xc is applied to the adding point 39 through a terminal 40. Accordingly, an output signal Xo of the adding point 39 can be described by the following equation (1).

$$Xo = Xc/(1 + G1 \times G2) \tag{1}$$

In addition, an external disturbance frequency component Y within the output tracking error signal of the mechanical-electrical converting system 35, can be described by the following equation $$Y = (G1 \times G2)Xc/(1 + G1 \times G2) \tag{2}$$

Hence, a ratio between the input signal Y and the output signal Xo of the adding point 39, can be described by the following equation (3) by using the equations (1) and (2).

$$Y/Xo = G1 \times G2 \tag{3}$$

The term $G1 \times G2$ on the right of the equation (3), is a transfer function describing the loop gain of the tracking servo circuit shown in FIG. 8. G1 and G2 are transfer functions respectively represented by a ratio of the input and output, and will hereinafter also be referred to as gains.

In other words, in the system shown in FIG. 8, the loop gain can be represented by the equation (3) by applying to the adding point 39 a signal having a level and a frequency which does not affect the play of the disc 13, as an external disturbance.

Thus, according to the present invention, only the frequency component of the external disturbance Xc is detected, and the gain G1 or G2 is subjected to the automatic gain control so that the signal Y or Xo becomes constant. Moreover, the other signal Xc or Y becomes constant at the adding point 39 shown in FIG. 8, by making the amplitude of the signal Xc constant. As a result, the loop gain $G1 \times G2$ becomes constant from the equation (3).

In a frequency range higher than a frequency (the so-called feedback cutoff frequency) $f_{cut}$ where the loop gain of the tracking servo circuit becomes 0 dB, the frequency characteristic of the equation (1) assumes a constant level regardless of a change in the loop gain $G1 \times G2$. On the other hand, in a frequency range which is lower than the frequency $f_{cut}$, the frequency characteristic of the equation (1) assumes a smaller level as the loop gain $G1 \times G2$ becomes larger. In the frequency range higher than the frequency $f_{cut}$, the frequency characteristic of the equation (2) assumes a larger level as the loop gain $G1 \times G2$ becomes larger. On the other hand, in the frequency range lower than the frequency $f_{cut}$, the frequency characteristic of the equation (2) assumes a constant level regardless of the change in the loop gain $G1 \times G2$.

Accordingly, in a case where a frequency higher than the frequency $f_{cut}$ is used for the frequency of the external disturbance Xc, the loop gain $G1 \times G2$ can be made constant by detecting the level of the signal Y and carrying out an automatic gain control with respect to the gain G1 so that the level of the signal Y controlled to a constant level. On the other hand, in a case where a frequency lower than the frequency $f_{cut}$ is used for the frequency of the external disturbance Xc, the loop gain $G1 \times G2$ can be made constant by detecting the level of the signal Xo and carrying out an automatic gain control with respect to the gain G2 so that the gain G2 is increased as the level of the signal Xo increases in order to control the level of the signal Xo to a constant level.

The frequency of the external disturbance Xc cannot be selected equal to the frequency $f_{cut}$. At the frequency $f_{cut}$, the frequency characteristics of the equations (1) and (2) respectively undergo a large change depending on the loop gain. Therefore, at the frequency $f_{cut}$, it is impossible to determine which of the signals Xo and Y has undergone what kind of a change.

For example, in the U.S. Pat. No. 4,148,083, there is disclosed a tracking system which employs the so-called wobbling system for intentionally wobbling heads of a video tape recorder in the width direction of the recorded track on a magnetic tape. However, this wobbling technique is used for the purpose of tracking, in order to constantly detect the tracking error even when a detected output cannot be obtained in the vicinity of an original operating point of the head. On the other hand, the external disturbance Xc employed in the present invention is not used for the tracking, but is used for controlling the gain of the AGC circuit so that the loop gain of the closed loop becomes constant. Therefore, the technical concept of employing the external disturbance Xc according to the present invention, is completely different from the wobbling technique employed for the purpose of tracking.

Figure 9:
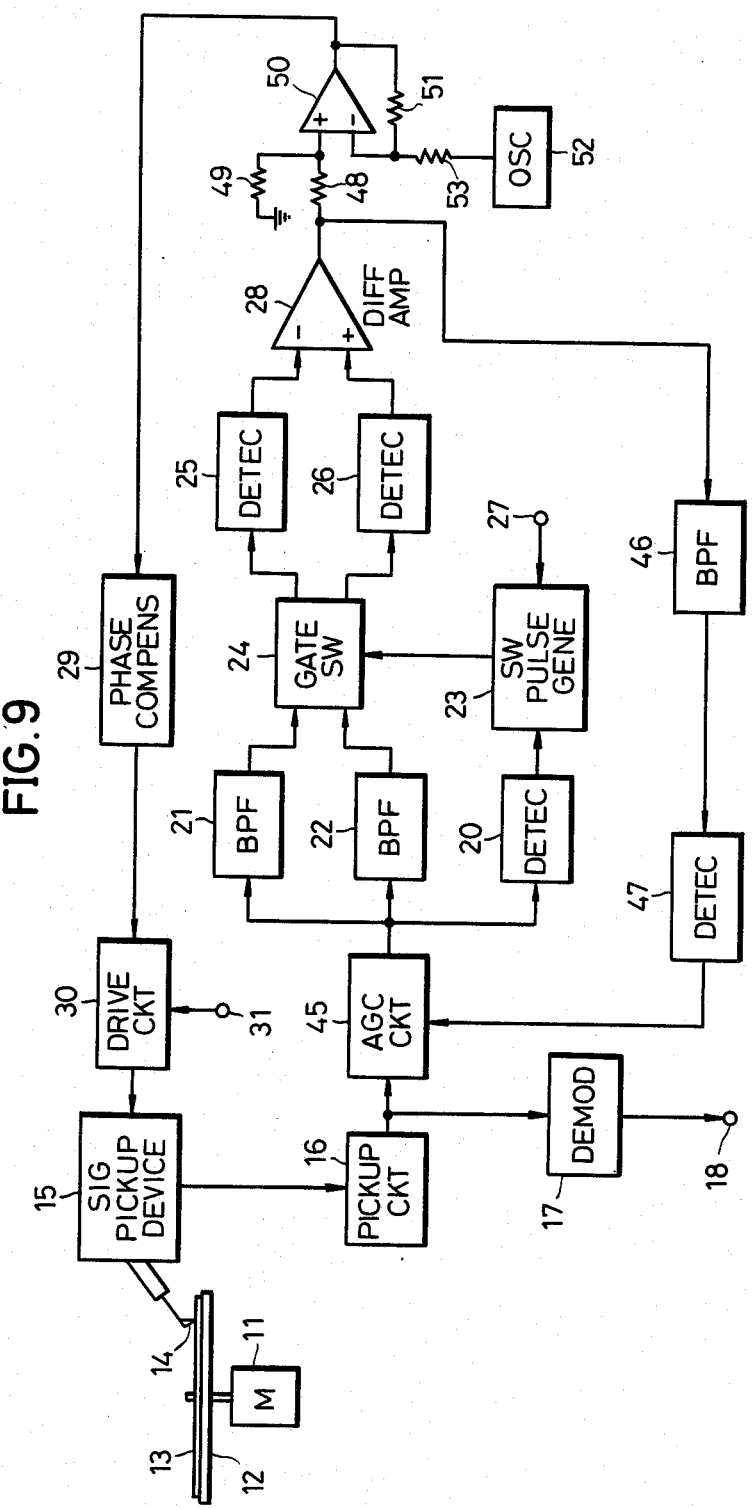
FIG. 9 is a systematic circuit diagram showing an embodiment of a tracking servo circuit for a rotary recording medium reproducing apparatus according to the present invention.

The present invention was made based on the principle described heretofore. Next, description will be given with respect to an embodiment of a tracking servo circuit according to the present invention by referring to FIGS. 9 through 11. In FIG. 9, those parts which are the same as those corresponding parts in FIG. 1 are designated by the same reference numerals, and their description will be omitted. The reproduced signal from the pickup circuit 16, is supplied to the bandpass filters 21 and 22 and the detector 20, through an AGC circuit 45. A circuit part between the pickup circuit 16 and the output of the differential amplifier 28, corresponds to the mechanical-electrical converting system 35. Accordingly, the gain G1 described before is varied by varying the gain of the AGC circuit 45.

The tracking error signal from the differential amplifier 28 is supplied to a bandpass filter 46. This error signal is also supplied to a non-inverting input terminal of an operational amplifier 50, through a voltage dividing circuit which is made up of resistors 48 and 49. An output terminal of the operational amplifier 50 is coupled to an inverting input terminal thereof through a resistor 51. A signal having a constant frequency is supplied from an oscillator 52, as the external disturbance Xc, to the inverting input terminal of the operational amplifier 50 through a resistor 53. The signal from the oscillator 52 has a frequency within an unoccupied frequency band which is lower than the frequency band in which the information signal is recorded, and is different from the frequency of any of the reference signals fp1 through fp3, so as not to affect the play of the disc 13. Further, since the level of the external disturbance Xc must be constant in order to keep the loop gain constant as described before, the signal from the oscillator 52 has a constant level. However, the level of the signal from the oscillator 52, is selected to a level which is higher than the level of the noise component having the same frequency, that is, at least higher than 10 dB.

Further, according to the present embodiment, the gain of the mechanical-electrical converting system 35 is variably controlled so that the level of the signal Y becomes constant, in order to keep the loop gain $G1 \times G2$ constant. Thus, the frequency of the signal from the oscillator 52 is selected slightly higher than the feedback cutoff frequency $f_{cut}$ (in the range of 1 kHz, for example). It is desirable to set the output signal frequency of the oscillator 52 to a frequency in the vicinity of the feedback cutoff frequency $f_{cut}$, because this enables separation of this frequency in the bandpass filter 46 with a relatively satisfactory signal-to-noise (S/N) ratio.

The operational amplifier 50 corresponds to the adding point 39 shown in FIG. 8, and superimposes the output signal Xc of the oscillator 52 on the tracking error signal. A superimposed signal (corresponding to the signal Xo in FIG. 8) obtained from the operational amplifier 50, is passed through the phase compensating circuit 29 and the driving circuit 30, and is then applied to the tracking coils within the signal pickup device 15. Consequently, the reproducing stylus 14 is displaced in the track width direction so that the tracking error quantity with respect to the main track becomes a minimum.

On the other hand, the tracking error signal from the differential amplifier 28 is supplied to the bandpass filter 46 wherein a frequency component (corresponding to the signal Y in FIG. 8) which is the same as the output signal Xc of the oscillator 52 is separated. Among the frequency components within the tracking error signal, the frequency components other than the frequency component Xc are high-frequency signals due to distortions of the disc 13 and noise. Hence, the bandpass filter 46 is used to frequency-select only the output signal frequency component Xc of the oscillator 52, by eliminating the frequency components other than the frequency component Xc. The output signal frequency component of the oscillator 52 within the tracking error signal from the differential amplifier 28 is separated by the bandpass filter 46, in order that the output signal Y of the mechanical-electrical converting system 35 may be controlled to become constant by the AGC circuit 45. The signal from the bandpass filter 46, which has the predetermined frequency and has been applied as the external disturbance Xc, is supplied to a detecting circuit 47. The detecting circuit 47 detects an envelope of the signal from the bandpass filter 46, and produces a D.C. voltage which is in accordance with the detected envelope. This D.C. voltage from the detecting circuit 47 is applied to the AGC circuit 45 as a control signal. As a result, the AGC circuit 45 carries out an automatic gain control with respect to the reproduced signal from the pickup circuit 16, so that the level of the signal within the tracking error signal from the differential amplifier 28, having the same frequency as the output signal frequency of the oscillator 52, is controlled to a constant level.

FIG. 10 shows an embodiment of a concrete circuit of the AGC circuit 45, the bandpass filter 46, and the detecting circuit 47. In FIG. 10, those parts which are the same as those corresponding parts in FIG. 9 are designated by the same reference numerals. In FIG. 10, the output signal of the oscillator 52 is applied to an input terminal 55, as the external disturbance Xc. The tracking error signal from the differential amplifier 28 is applied to an input terminal 56. The output signal Xo of the operational amplifier 50 is supplied to the phase compensating circuit 29, through an output terminal 64. The tracking error signal obtained through the input terminal 56, passes through a variable resistor VR1 for adjusting the gain and a resistor R1 which are coupled in series, and is supplied to an inverting input terminal of an operational amplifier 57 which comprises a feedback resistor R2. An output signal of the operational amplifier 57 is supplied to a twin-T circuit which is made up of a resistor R3, a variable resistor VR2 for adjusting the frequency, a capacitor C1, a resistor R4, a capacitor C2, a resistor R5, and a capacitor C3. An output signal of this twin-T circuit is passed through an operational amplifier 58 which constitutes a voltage-follower so that the load resistance of the twin-T circuit becomes infinitely large, a variable resistor VR3 for adjusting the Q factor, and a resistor R6, and is supplied to the inverting input terminal of the operational amplifier 57.

A circuit which is made up of the two operational amplifiers 57 and 58 and the twin-T circuit, is a single-tuned circuit having a single-humped characteristic, and constitutes the bandpass filter 46. In this single-tuned circuit, the Q factor is selected to a value in the range of 100, for example. The single-tuned circuit separates from the tracking error signal the frequency which is the same as the output oscillation frequency of the oscillator 52.

The signal obtained from the operational amplifier 57, having the predetermined frequency, is supplied to the detecting circuit 47 which comprises a capacitors C5 and C6, a resistor R7, and a diode D1. The detecting circuit 47 detects the positive polarity envelope and produces the D.C. voltage. The D.C. voltage from the detecting circuit 47 is passed through an integrating circuit which is made up of resistors R8 and R9, an operational amplifier 59, and a capacitor C7, and is supplied to a second gate of a dual gate MOS FET 60 through a resistor R10. The second gate of the MOS FET 60 is coupled to a power source terminal 63, through a circuit which is made up of resistors R11 and R12 and a capacitor C8. The second gate of the MOS FET 60 is also grounded through a capacitor C9. A source of the MOS FET 60 is grounded through a resistor R15. A connection point between a drain of the MOS FET 60 and a resistor R14, is grounded through a capacitor C11, and is also coupled to an output terminal 62 through a capacitor C11. A circuit which is made up of the MOS FET 60 and the like, constitutes the AGC circuit 45.

Numerical examples of constants for each of the circuit elements shown in FIG. 10, are given below.

VR1=50 kΩ, VR2=5 kΩ, VR3=1 kΩ, R1=5.6 kΩ, R2=18 kΩ, R3=10 kΩ, R4=68 kΩ, R5=2.2 kΩ, R6=2.7 kΩ, R7=10 kΩ, R8=47 kΩ, R9=390 kΩ, R10=15 kΩ, R11=15 kΩ, R12=39 kΩ, R13=22 kΩ, R14=1 kΩ, R15=100 Ω, C1=183 pF, C2=123 pF, C3=122 pF, C5=C7=C8 =22 μF, C6=563 pF, C9=103 pF, C10=120 pF, and C11=33 pF.

The resistances of the resistors 48, 51, and 53 are respectively set to 8.2 kΩ, and the external disturbance is set to 40 mV$_{rms}$ at 2 kHz.

The reproduced RF signal from the pickup circuit 16, which is applied to an input terminal 61, is applied to a first gate of the MOS FET 60 through a circuit which is made up of a capacitor C10 and a resistor R13. Thus, the gain is variably controlled in response to the D.C. voltage which is applied to the second gate of the MOS FET 60 from the operational amplifier 59. In this case, the MOS FET 60 is controlled so that the gain decreases as the D.C. voltage from the detecting circuit 47 becomes larger, and the gain increases as the D.C. voltage from the detecting circuit 47 becomes smaller. Therefore, the signal within the tracking error signal from the differential amplifier 28, having the same frequency as the output oscillation frequency of the oscillator 52, is constantly controlled to the predetermined constant level.

Accordingly, when carrying out a tracking operation with respect to the first disc having the characteristic shown in FIG. 5A according to the present embodiment, the gain of the AGC circuit 45 is controlled, so that the signal which is within the tracking error signal from the differential amplifier 28 and has the same frequency as the output oscillation frequency of the oscillator 52, is controlled to a constant level. Thus, as shown in FIG. 11A, the reference signal fp1 or fp2 is reproduced with a level L2 at the output of the AGC circuit 45 when the reproducing stylus 14 is positioned at the center position C of the main track. On the other hand, when carrying out a tracking operation with respect to the second disc which has the characteristic shown in FIG. 5B in which the levels Fp1 and Fp2 of the reproduced reference signals fp1 and fp2 are smaller than the levels in the characteristic shown in FIG. 5A, the gain of the AGC circuit 45 which keeps the loop gain constant is also controlled. In this case, as shown in FIG. 11B, the reference signals fp1 and fp2 are reproduced with a level L3 which is different from the level L2, at the output of the AGC circuit 45. In other words, according to the present embodiment, the sum of the levels of the reproduced reference signals fp1 and fp2 is not made constant. Instead, the gain of the AGC circuit 45 is controlled so that the level of the frequency component which is the same as the output oscillation frequency of the oscillator 52 and is included within the tracking error signal as the external disturbance Xc, assumes a constant level. As shown in FIGS. 11A and 11B, the slopes of the characteristic curves Fp1 and Fp2 when the reproducing stylus 14 is positioned at the center position C of the main track, that is, the loop gain for the two cases, are approximately the same.

Therefore, the loop gain of the tracking servo circuit is constantly kept to a value which is approximately constant, even when playing various kinds of discs in which the pits of the recorded reference signals fp1 and fp2 have different shapes, depths, widths, and the like, and even when the electrode width of the reproducing stylus 14 varies as the reproducing stylus 14 wears out due to long period of use.

The present invention is not limited to the embodiment described heretofore. For example, the loop gain may be kept constant by changing the output oscillation frequency of the oscillator 52 to a frequency which is slightly lower than the feedback cutoff frequency $f_{cut}$, changing the passing frequency band of the bandpass filter 46, and supplying to the bandpass filter 46 a signal Xo which is obtained from a part of the transmission path between the output of the operational amplifier 50 and the output of the driving circuit 30. In this case, the frequency component which is identical to the output oscillation signal of the oscillator 52, is separated in the bandpass filter 46. As described before, the detecting circuit 47 must be designed to control the gain of the AGC circuit 25 substantially proportionally to the level of the signal Xo in this case.

The main information signal which is recorded on the main track on the disc 13, is not limited to the information signal having the frequency spectrum shown in FIG. 2. For example, the information signal may be a digital data which is obtained by subjecting a plurality of channels of audio signals to a digital pulse modulation. In addition, it is possible to arbitrarily and variably set the loop gain by variably setting the input signal which is used as the external disturbance Xc, as may be readily understood from the equations (1) through (3). Moreover, the pickup reproducing element is not limited to the reproducing stylus 14, and the pickup reproducing element may be a reproducing element which uses a light beam.

Further, the present invention is not limited to these embodiments, but various variations and modifications may be made without departing from the scope of the present invention.

What is claimed is:

1. A tracking servo circuit for a rotary recording medium reproducing apparatus which picks up and reproduces a recorded signal from a rotary recording medium by a reproducing element, said rotary recording medium being recorded with a main information signal on a spiral information signal recorded track or concentric information signal recorded tracks thereon, said information signal recorded track having a first reference signal for tracking control recorded on one side thereof and having a second reference signal for tracking control recorded on the other side thereof such that the sides on which the first and second reference signals are recorded with respect to said information signal recorded track are interchanged for each track turn of the rotary recording medium, a third reference signal being recorded at positions on the rotary recording medium where the sides on which said first and second reference signals are recorded with respect to said information signal recorded track are interchanged, said tracking servo circuit comprising:

control means for controlling said reproducing element to follow and scan over said information signal recorded track;

separating means for separating said first, second, and third reference signals from a reproduced RF signal which is reproduced by said reproducing element;

detecting means for detecting said first and second reference signals separated in said separating means;

circuit means for switching an input transmission path of said first and second reference signals to said detecting means in response to said third reference signal which is separated in said separating means, and for forming and producing a tracking error signal from a differential amplifier based on a detection signal from said detecting means;

an oscillator for producing a signal which has a constant amplitude and a constant frequency within a frequency band which is lower than a frequency band in which said main information signal is recorded;

signal superimposing means for superimposing the signal from said oscillator on said tracking error signal;

signal supplying means for supplying to said control means a superimposed signal from said signal superimposing means; a filter circuit for filtering said signal having the constant frequency from said tracking error signal; and automatic cain control circuit means provided in a stage before said circuit means, for generating a gain control signal which is obtained by detecting an envelope of an output signal of said filter circuit, said automatic gain control circuit means controlling the level of said reproduced RF signal so that said signal which is within the input tracking error signal of said filter circuit and has the constant frequency is kept to an approximately constant level.

2. A tracking servo circuit as claimed in claim 1 in which said automatic gain control circuit means comprises an automatic gain control circuit provided at an input stage of said separating means, and a detecting circuit for detecting the envelope of the output signal of said filter circuit and for applying an envelope detection signal to said automatic gain control circuit as a gain control voltage.

3. A tracking servo circuit as claimed in claim 1 in which said oscillator produces a signal having a constant frequency which is near a feedback cutoff frequency at which the loop gain of said tracking servo circuit becomes equal to 0 dB.

4. A tracking servo circuit as claimed in claim 1 in which said oscillator produces a signal having a constant frequency which is higher than a feedback cutoff frequency at which the loop gain of said tracking servo circuit becomes equal to 0 dB, said filter circuit is supplied with said tracking error signal which is obtained from an output terminal of said circuit means, and said automatic gain control circuit means carries out a gain control operation which is substantially inversely proportional to the level of the output signal of said filter circuit.

5. A tracking servo circuit as claimed in claim 1 in which said oscillator produces a signal having a constant frequency which is lower than a feedback cutoff frequency at which the loop gain of said tracking servo circuit becomes equal to 0 dB, said filter circuit is supplied with said tracking error signal which is obtained from a part of a transmission path in said signal supplying means, and said automatic gain control circuit means carries out a gain control operation substantially proportional to the level of the output signal of said filter circuit.

* * * * *